United States Patent [19]
Sandor et al.

[11] Patent Number: 6,080,967
[45] Date of Patent: Jun. 27, 2000

[54] COMBINED USER ACTUATION AND THERMOSTAT SWITCH ASSEMBLY

[75] Inventors: James A. Sandor, Trumbull; Charles Z. Krasznai, Fairfield, both of Conn.; Charles S. Mertler, Jr., deceased, late of Norwalk, Ohio, by Barbara Mertler, executrix

[73] Assignee: HP Intellectual Corp., Wilmington, Del.

[21] Appl. No.: 09/360,104

[22] Filed: Jul. 23, 1999

[51] Int. Cl.[7] .............................. A21B 1/40; H01H 37/54
[52] U.S. Cl. ..................... 219/414; 219/413; 337/343; 337/349; 337/365; 337/368
[58] Field of Search ..................... 219/412–414; 337/335, 343, 345, 349, 368, 377, 378, 387

[56] References Cited

U.S. PATENT DOCUMENTS

| | | | |
|---|---|---|---|
| 2,237,705 | 4/1941 | Kohl | 200/67 |
| 2,260,964 | 10/1941 | Wilms | 200/67 |
| 2,558,219 | 6/1951 | Kohl | 200/67 |
| 3,624,323 | 11/1971 | Borgmann | 200/67 D |
| 3,660,793 | 5/1972 | Them et al. | 337/348 |
| 3,665,360 | 5/1972 | Norden | 337/100 |
| 3,684,860 | 8/1972 | Snyder | 219/413 |
| 4,178,498 | 12/1979 | Snyder | 219/413 |
| 4,189,632 | 2/1980 | Swanson et al. | 219/413 |
| 4,302,660 | 11/1981 | Swanson et al. | 219/391 |
| 4,382,175 | 5/1983 | Huggler | 219/413 |
| 4,413,173 | 11/1983 | Grove et al. | 219/412 |
| 4,456,820 | 6/1984 | Krasznai et al. | 219/398 |
| 4,476,453 | 10/1984 | Hollweck | 337/368 |
| 4,517,452 | 5/1985 | Krasznai et al. | 219/413 |
| 4,746,785 | 5/1988 | De Longhi | 219/386 |
| 4,799,038 | 1/1989 | Tabei | 337/379 |
| 5,101,186 | 3/1992 | Durum | 337/76 |
| 5,870,013 | 2/1999 | Grijn et al. | 337/343 |

Primary Examiner—Joseph Pelham
Attorney, Agent, or Firm—Barry E. Deutsch

[57] ABSTRACT

An electric toaster comprising a heating element; and a combined user actuation and thermostat switch assembly connected to the heating element. The switch assembly comprises a thermostat having a bi-metal electrical contact blade and a snap-acting electrical contact blade, and a user actuated member for moving the snap-acting blade towards the bi-metal blade. The switch assembly provides an electrical path between the heating element and an electrical power supply cord without an additional separate user actuated power switch along the path.

13 Claims, 6 Drawing Sheets

6,080,967

1

COMBINED USER ACTUATION AND THERMOSTAT SWITCH ASSEMBLY

BACKGROUND OF THE INVENTION

1. Field of the Invention

The present invention relates to heating appliances and, more particularly, to a combined thermostat and power ON switch assembly.

2. Prior Art

Electric toaster ovens which use thermostats are well known in the art as shown in U.S. Pat. Nos. 3,684,860 and 4,189,632. Snap-acting thermostat switches are also known as shown in U.S. Pat. Nos. 2,237,705 and 2,558,219. For heating controls in toaster ovens of the prior art that use electromechanical control systems, after manual actuation to apply alternating current (AC) line power, a bimetal-based device reacts to a combination of energy, ambient temperature, and time until a desired value is reached. At that point, an electrical signal is generated that signals an AC line power-switching device to turn line power off. Through a user selectable control, the desired value can be varied. For heating controls in toaster ovens of the prior art that use electronic control systems, an electronic circuit is substituted for the bimetal based device. Limitations exist with both of these types of systems in that both systems require a separate AC switching function with related cost, size, and increase in potential failure modes. Some versions also require a separate power switch control power or appliance AC line power.

Single set point, manually resettable thermostats are commonly used in thermal carafe thermostats or other coffee makers that stop AC power with the completion of the brew cycle. These can be reset for a new cycle with manual actuation. Thermostat based controls are commonly utilized in toaster ovens, but AC line power is switched on and off with an independent device. Some prior art toasters utilized a bimetal based control that turned power on by setting a spring loaded latch to close a line power switch and then turned power off by mechanically releasing the spring loaded latch thereby opening the switch. Stevens Manufacturing produced and sold a heating plate in the 1960's with a control having a thermostat.

SUMMARY OF THE INVENTION

In accordance with one embodiment, an electric toaster is provided comprising a heating element; and a combined user actuation and thermostat switch assembly connected to the heating element. The switch assembly comprises a thermostat having a bi-metal electrical contact blade and a snap-acting electrical contact blade, and a user actuated member for moving the snap-acting blade towards the bi-metal blade. The switch assembly provides an electrical path between the heating element and an electrical power supply cord without an additional separate user actuated power switch along the path.

In accordance with another embodiment of the present invention, an electrical heating appliance is provided having a heating element, an electrical power supply cord having a plug for connection to an electrical outlet for supplying electricity to the heating element, and a combined user actuated power ON and thermostat switch assembly connecting the electrical power supply cord to the heating element. The switch assembly comprises a user actuated member and a thermostat. The thermostat comprises a bi-metal electrical contact blade and a snap-acting electrical

2 contact blade. The user actuated member and the bi-metal electrical contact blade are adapted to move the snap-acting blade. The switch assembly provides an electrical path between the heating element and the power supply cord.

In accordance with one method of the present invention, A method of controlling heating in an electrical heating appliance is provided comprising steps of providing the appliance with a thermostat having a snap-acting electrical contact blade and a bi-metal electrical contact blade; actuating a user actuated member to push against and the snap-acting blade and thereby snap move the snap-acting blade from a first position into contact with the bi-metal blade at a second position, wherein an electrical path is provided through the thermostat to a heating element of the appliance; and the bi-metal blade moving with a temperature increase in the appliance to move the snap-acting blade to snap move away from the bi-metal blade back towards the first position, wherein the thermostat and user actuated member function as a power ON switch for the appliance.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
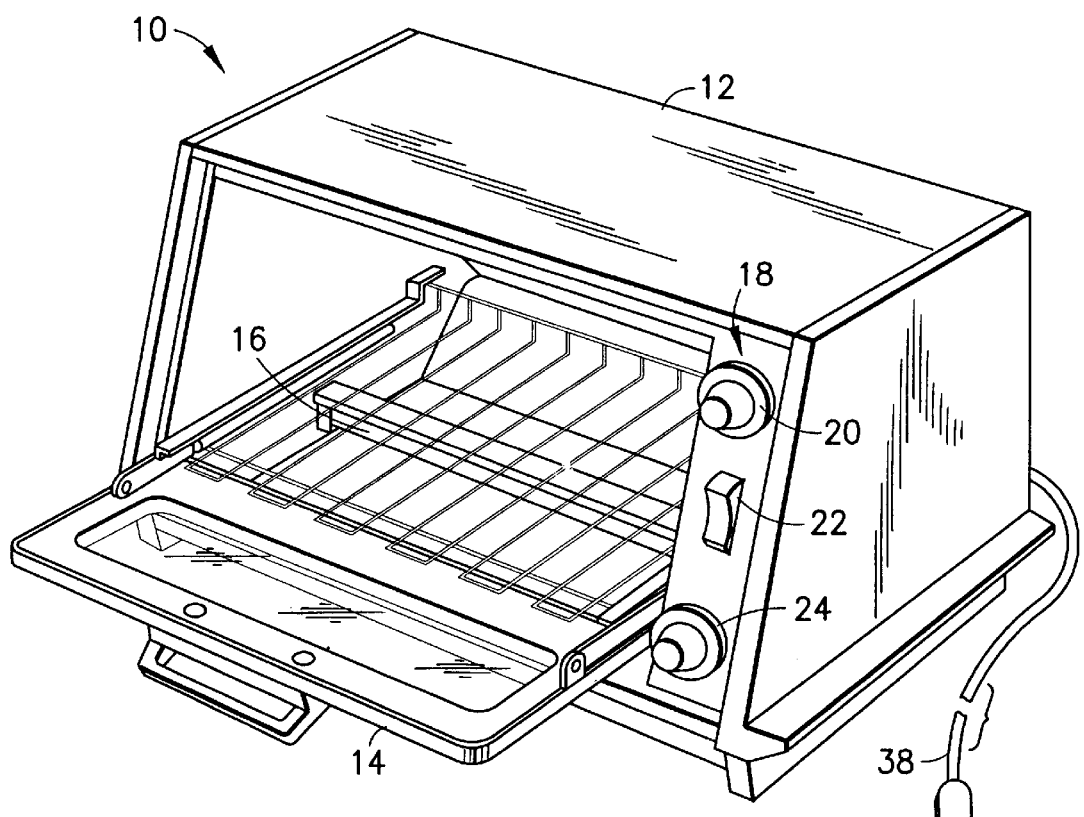
FIG. 1 is a perspective view of an electric toaster oven incorporating features of the present invention.

Referring to FIG. 1, there is shown a perspective view of an electric toaster oven 10 incorporating features of the present invention. Although the present invention will be described with reference to the embodiments shown in the drawings, it should be understood that the present invention can be embodied in many alternate forms of embodiments. In addition, any suitable size, shape or type of elements or materials could be used.

Figure 2:
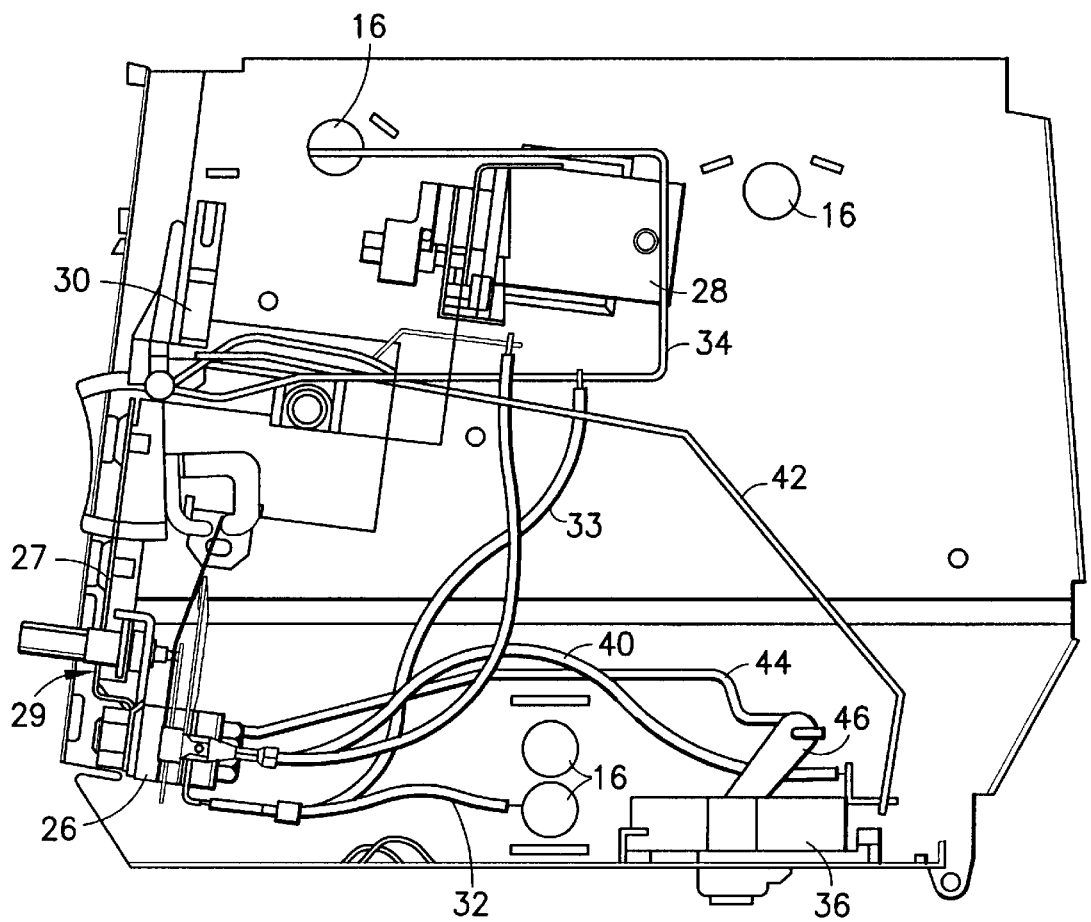
FIG. 2 is a partial schematic view of the inside of the control section of the oven shown in FIG. 1.

The oven 10 generally comprises a housing 12, a door 14, heating elements 16, and a control section 18. The control section 18 includes user actuatable controls including an oven ON/OFF and temperature control knob 20, a toast ON/OFF rocker switch 22, and a toast light/dark control knob 24. In alternate embodiments any suitable additional and/or alternative user interface controls could be provided. Referring also to FIG. 2, the control section 18 includes a toast control thermostat 26, an oven control thermostat 28, and an oven control switch assembly 30. The oven control thermostat 28 and switch assembly 30 are described in detail in U.S. Pat. No. 5,889,259 issued Mar. 30, 1999 and assigned to the same assignee of the present application; which is hereby incorporated by reference in its entirety. However, any suitable oven control system could be provided or, no oven control need be provided, such as for a toaster or heating appliance that does not have an oven function. Electrical wires 32, 33 electrically connect the toast thermostat 26 to the top and bottom heating elements 16; the wire 33 being connected to the top heating element through bus 34. The control section 18 also includes a main switch assembly 36. The main switch assembly 36 is electrically connected to the electrical supply cord 38 (see FIG. 1), the toast thermostat 26 by wire 40, and the oven control switch assembly 30 by bus 42. A link 44 is connected to a lever 46 of the main switch assembly 36. The link 44 is connected to the door 14 (see FIG. 1) to turn the switch 36 off when the door is opened. However, any suitable main switch assembly could be provided.

Figure 2A:
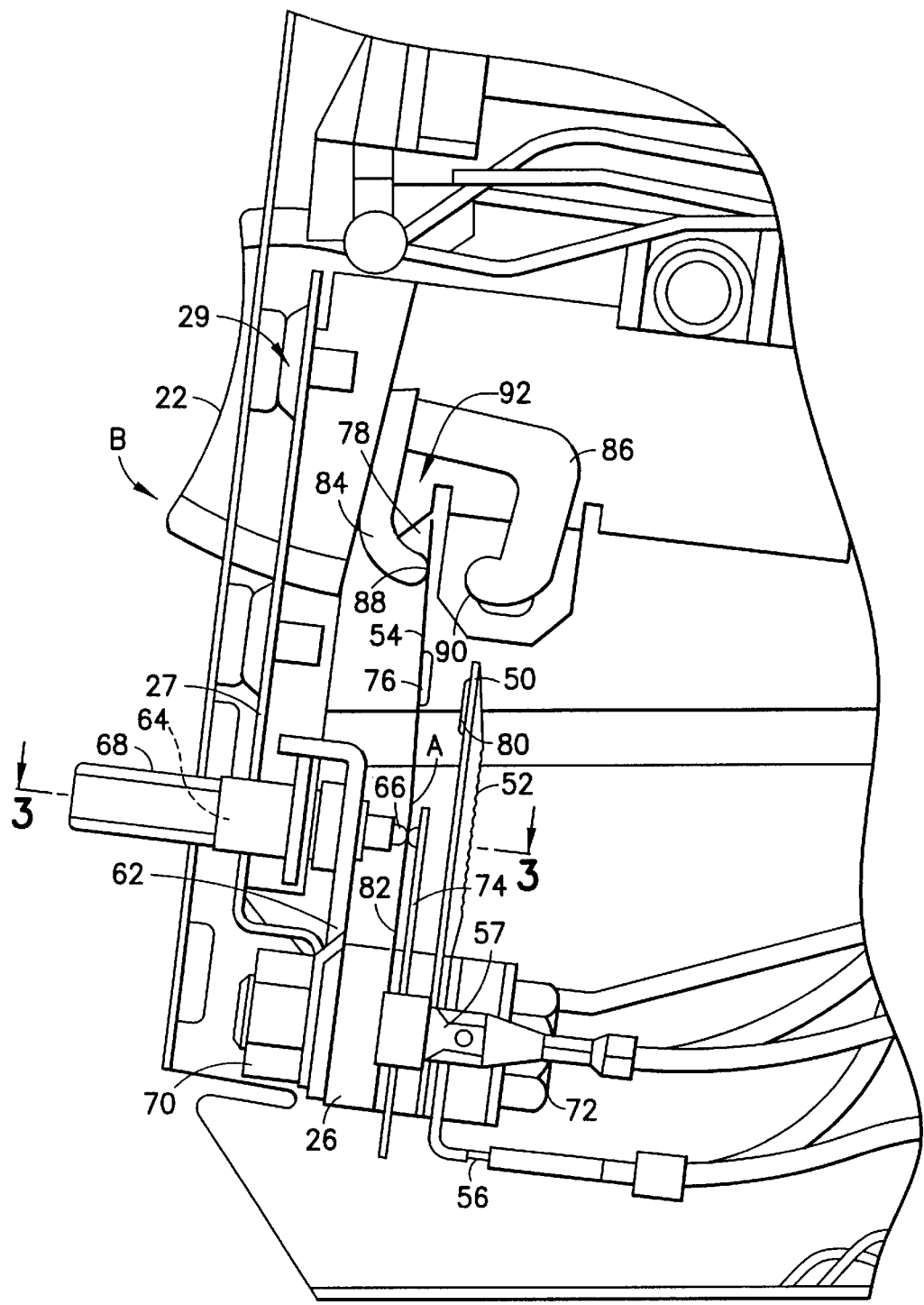
FIG. 2A is an enlarged partial view of the control section shown in FIG. 2 with the rocker switch at a first position.
Figure 3:
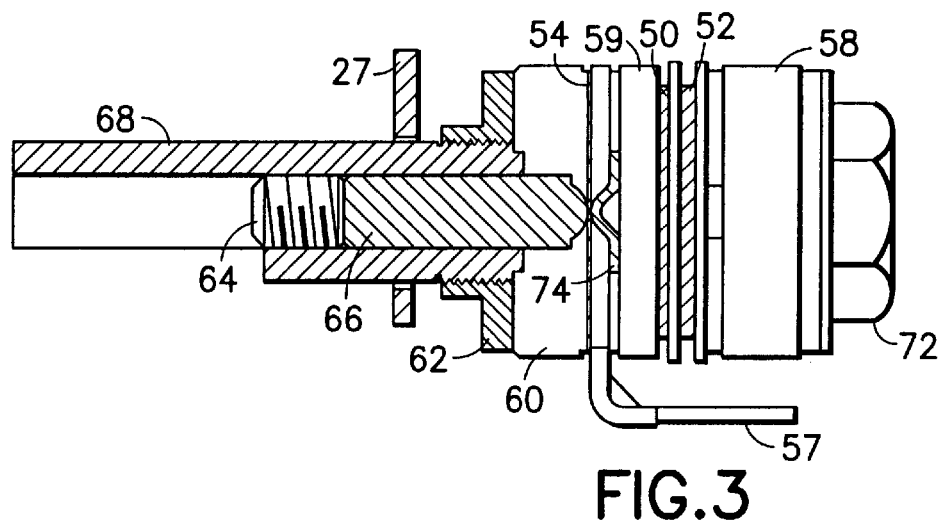
FIG. 3 is a schematic cross-sectional view of the thermostat shown in 2A taken along line 3—3.

Referring also to FIGS. 2A and 3, the toast thermostat 26 generally comprises a bimetal blade 50, a heater ribbon 52, a contact or over-center snap blade 54, terminals 56, 57, insulating washers 58, 59, 60, top plate 62, a calibrating screw 64, an insulating tip 66, a control shaft 68, a nut 70, a bolt 72, and a support blade 74. Heater ribbon 52 need not be provided. Preferably, the toast thermostat 26 is fixedly attached to a mounting plate 27 to form an assembly 29 which can be relatively precisely and easily located and mounted to the frame or housing 12 of the toaster oven. The nut 70 and bolt 72 keep members properly orientated and assembled in a sandwich type of configuration. The insulating tip 66 is slidably located inside the control shaft 68. The calibration screw 64 is threadingly connected to the control shaft 68 and contacts an end of the insulating tip 66 for adjusting the position of the insulating tip 66 relative to the control shaft 68. The opposite end of the insulating tip is located against contact or fulcrum blade 54. The control shaft 68 is threadingly connected to the top plate 62 for adjustably longitudinally moving control shaft 68 and the insulating tip 66 relative to the top plate 62 when the control shaft 68 is axially rotated. The knob 24 is mounted to the front end of the control shaft 68 such that the shaft 68 is rotated when the knob 24 is rotated by the user. The knob 24 can be rotated by the user to control the toast color (dark/light). This is accomplished by moving the contact blade 54 closer to or further away from the bimetal blade 50 at the point where the insulating tip 66 contacts the contact blade 54 below area A. The calibration screw 64 can be used to adjust the position of the tip 66 relative to the shaft 68 and knob 24.

As seen in FIG. 2A, the contact blade 54 is contacted by the insulating tip 66 on one side and, the support blade 74 contacts the opposite side of the contact blade 54. The contact blade has a main section 82 and a contact 76. The main section 82 is preferably a one-piece snap-acting metal blade with a snap-acting bend point at point A. The contact blade 54 has a top end with the contact 76 and an extended section 78 above the contact 76. The bimetal blade 50 also has a contact 80.

The rocker switch 22 is pivotably mounted to the housing 12. The rear end of the rocker switch 22 has two arms; a front arm 84 and a rear arm 86. The two arms 84, 86 have respective blade contact areas 88, 90. A gap 92 is provided between the two blade contact areas 88, 90. The extended section 78 of the contact blade 54 extends into the gap 92. The gap 92 is larger than the thickness of the extended section 78. The contact blade 54 is movable in the gap 92 between the two blade contact areas 88, 90.

FIG. 2A shows the rocker switch 22 at a home position and the contact blade 54 of the thermostat 26 at a forward OFF position. The extended section 78 is located against the contact area 88 of the front arm 84 of the rocker switch 22. Since the contacts 76, 80 are spaced from each other, no electricity flows through the thermostat 26 to the heating elements 16.

Figure 2B:
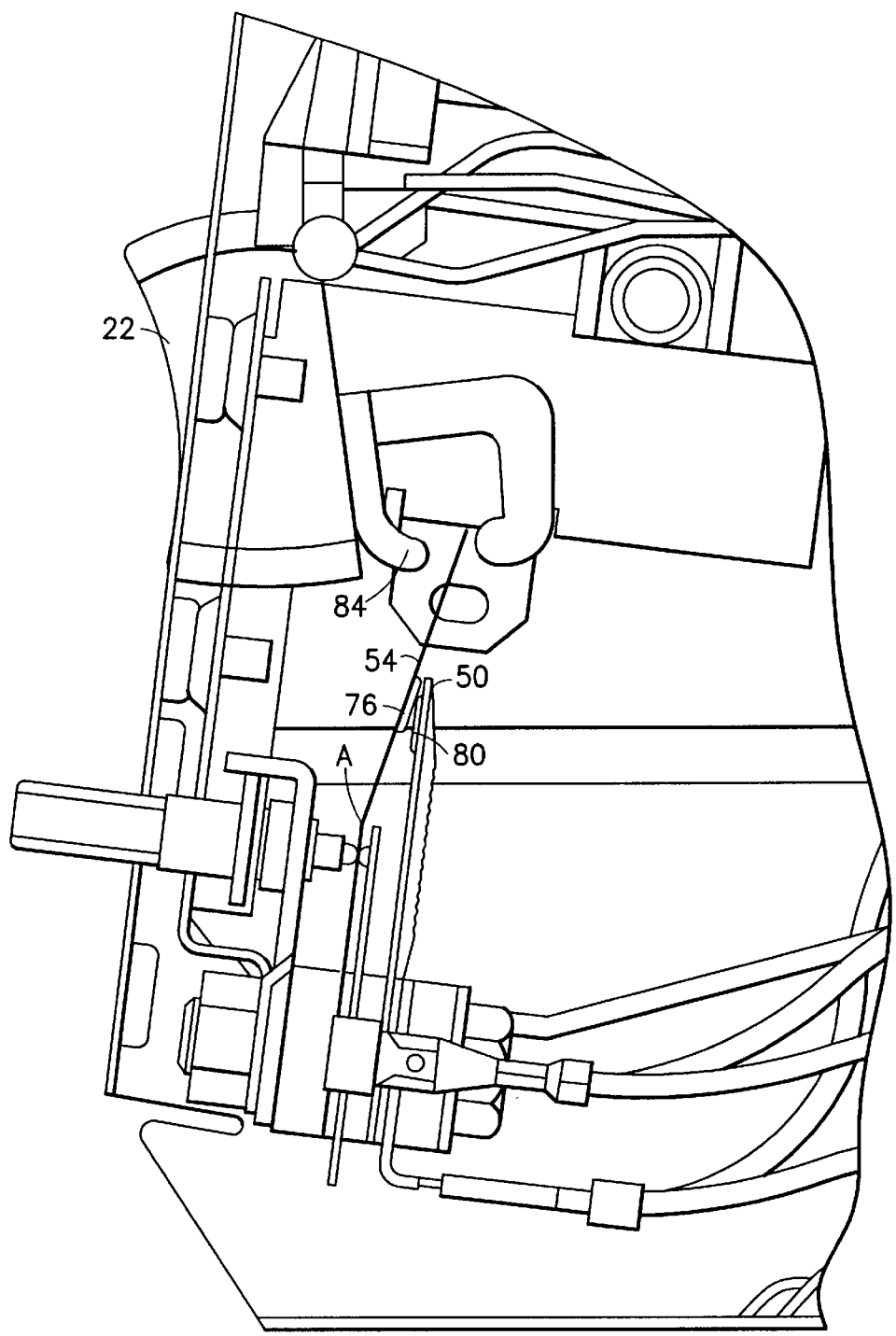
FIG. 2B is an enlarged partial view as in FIG. 2A with the rocker switch moved to a second position.

In order to start a toast cycle, the user actuates or depresses the rocker switch 22 as indicated by arrow B. This moves the rocker switch 22 to the position shown in FIG. 2B. The front arm 84 of the rocker switch 22 pushes the contact blade 54 rearward. The contact blade 54 snap bends at area A and the contacts 76, 80 contact each other. Electricity can now flow through the two blades 54, 50 to the heating elements 16.

Figure 2C:
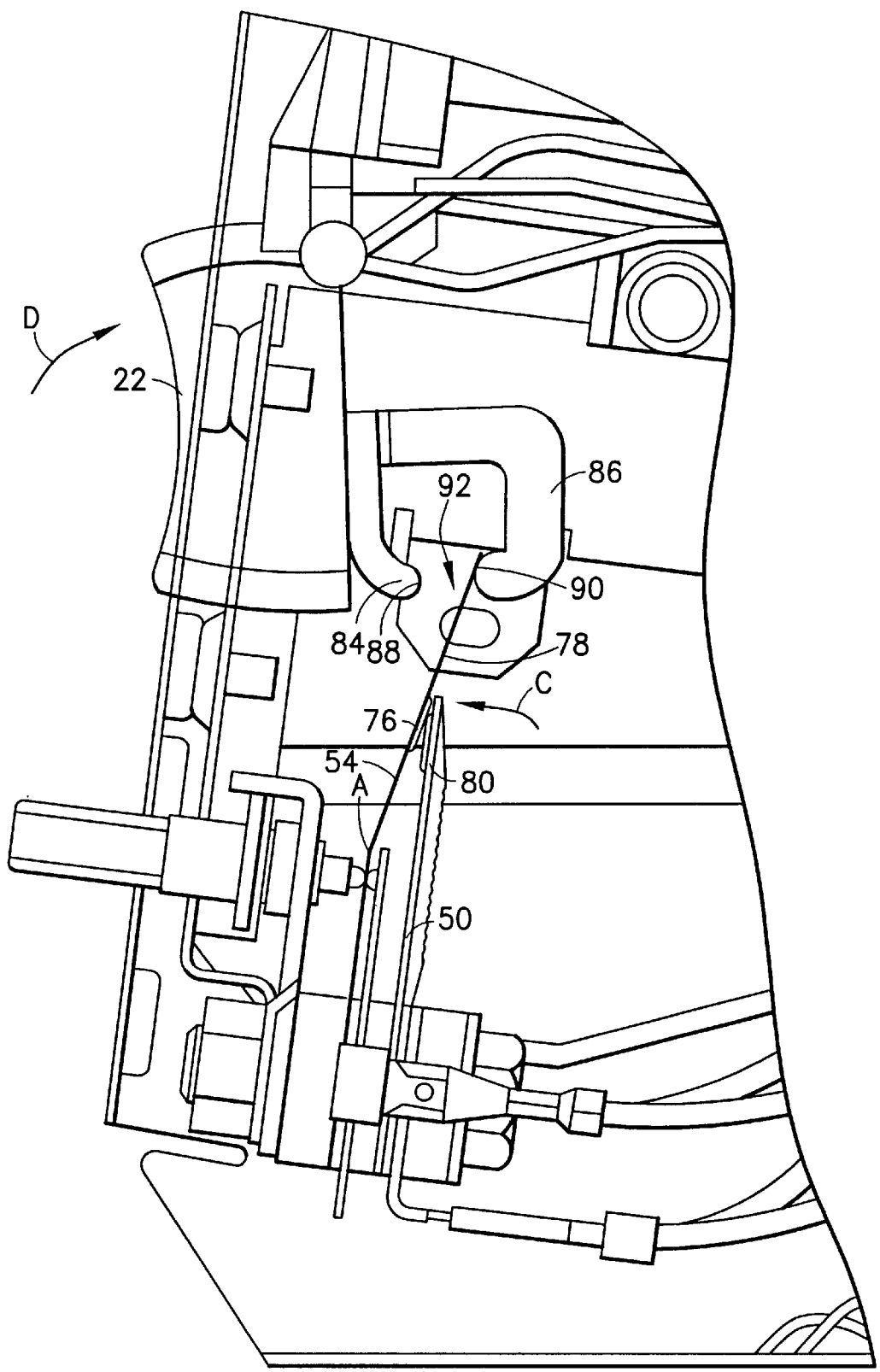
FIG. 2C is an enlarged partial view as in FIG. 2A with the rocker switch moved to a third position.

As the user releases the rocker switch 22 after its actuation, the rocker switch 22 can move to the position shown in FIG. 2C; either by gravity action or by a small bias of a spring (not shown). The contact area 88 of the front arm 84 is spaced from the contact blade 54 and the contact area 90 of the rear arm 86 rests against the rear side of the extension section 78. As heating of the bimetal blade 50 occurs, the top of the bimetal contact 50 bends forward as indicated by arrow C. This causes the bimetal blade 50 to push the contact blade 54 forward. The gap 92 between the two rocker arms 84, 86 allows the extended section 78 to freely move in the gap 92. Eventually, the force exerted by the bimetal blade 50 against the contact blade 54 is sufficient to cause the contact blade 54 to snap at area A back to its open configuration shown in FIG. 2A; the extension section 78 moving back against the contact area 88 of the rocker's front arm 84 and the two contacts 76, 80 once again being spaced from each other. Thus, electricity no longer flows through the thermostat to the heating elements 16 and the toast cycle is complete. An alternative method of ending the toast cycle would comprise the user depressing the top of the rocker switch 22 as indicated by arrow D. The rear arm 86 of the rocker switch 22 would positively move the contact blade 54 forward causing the area A to snap back to its forwarded bowed OFF position shown in FIG. 2A. Again electricity would no longer flow through the thermostat 26 to the heating elements because the two contacts 76,80 would become spaced from each other when the contact blade 54 snaps back to its forward bowed position.

An object of the present invention is to control toast color or heat energy input for a controlled time period with a variable electromechanical thermostat. With the present invention, no separate power switching function is required. The over-center snap blade 54 switches AC power off directly, based on a bimetal's reaction to energy, ambient temperature and time. Manual actuation of the same over-center spring blade starts the control and appliance AC line power. Manual actuation of the over-center spring blade can also stop the control and appliance AC line power.

An over-center, snap-acting blade of the present invention is preferably assembled in a conventional leaf-type thermostat design. The blade has two naturally stable states. When an increasing force is applied perpendicular to the end of the blade from a naturally stable state, the blade will deflect evenly until a force is reach where the snap feature causes the blade to deflect suddenly away from the direction of the applied force. It will then reach the opposite naturally stable state, and will remain in that state even when the force is removed. In this application the snap blade is part of a blade and contact pair. If the thermostat assembly starts in an open contact state, an a manual force is applied perpendicular to the blade and opposite the contact, the blade will deflect until it snaps and reaches a stable state with the contacts closed (even after the manual force is released). This connects line power and starts the toast/heat cycle. Deflection of the thermostat bimetal with heat will apply a force in the opposite direction to the blade until this blade snaps and reaches a natural forward state with the contacts open. If desired, power can be switched off manually by applying a force in the same direction as the bimetal deflection. By moving the blade reference with a screw or other means, the force required by the bimetal to open the contacts can be varied thereby allowing the user to vary toast color or heat input.

Additional features can be provided that enhance the device's ability to deliver similar toast color or energy without cooling to room ambient temperature. An ambient compensating bimetal may be assembled into the thermostat in such a manner as to apply a counter-force to the thermostat bimetal which will, in turn, cause an increase in the heat required for the thermostat bimetal to operate the over-center blade to open the contact pair. A heat generating device thermally coupled to the thermostat bimetal enhances compensation capability by heating the bimetal to a higher temperature than it would normally reach during the first cycle. This reduces the relative change in bimetal deflection and time required to open the AC circuit during consecutive cycles.

Use of a similar device in other energy/time based appliances requiring a range of operation of 30 seconds to 10 minutes can be provided as an automatic shutoff device or as a device to allow delayed switching of dual devices from one input; press an actuator to start two devices and, after a given time, one device with independent time control turns off while the other device continues.

Figure 4:
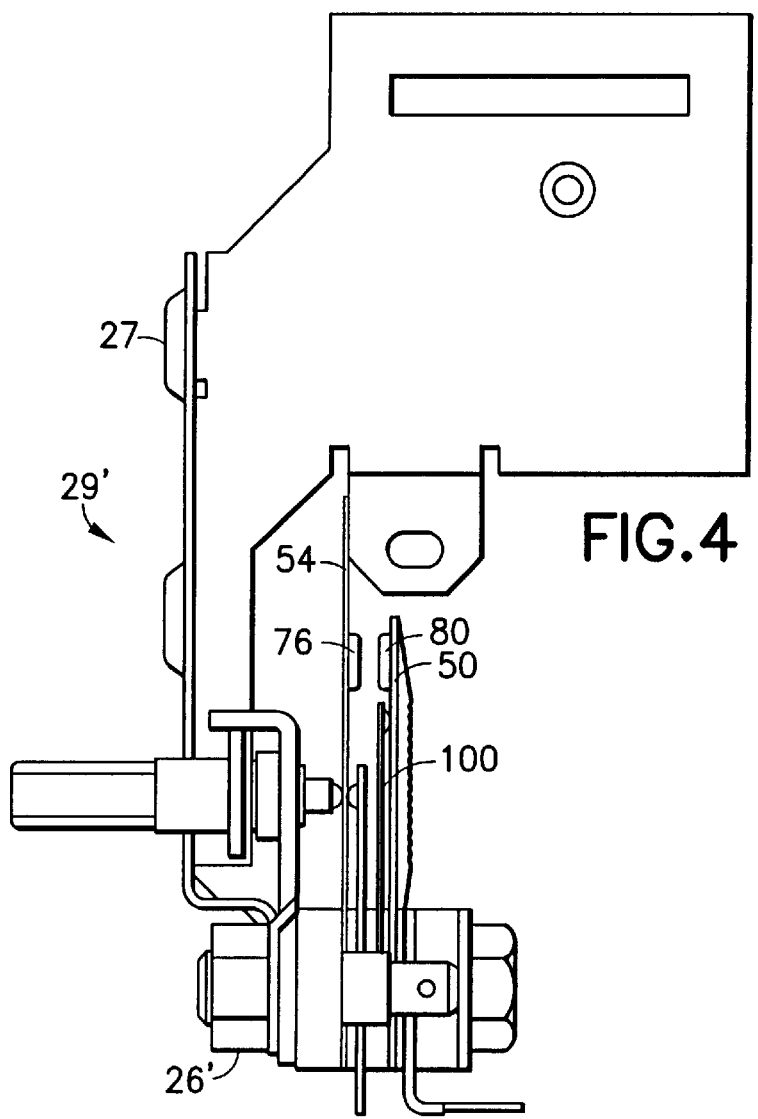
FIG. 4 is an elevational view of an alternate embodiment of a thermostat assembly incorporating features of the present invention.

Referring now to FIG. 4, an alternate embodiment will be described. The assembly 29' includes the mounting plate 27 and the thermostat 26'. The thermostat 26' is substantially the same as the thermostat 26 except that the thermostat 26' includes an ambient compensating bimetal blade 100. The compensating blade 100 is assembled into the thermostat in such a manner as to apply a counter-force to the thermostat bimetal blade 50 which will, in turn, cause an increase in the heat required for the thermostat bimetal blade 50 to operate the over-center blade 54 to open the contact pair 76,80.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An electric toaster comprising:

a heating element; and a combined user actuation and thermostat switch assembly connected to the heating element, the switch assembly comprising a thermostat having a bi-metal electrical contact blade and a snap-acting electrical contact blade, and a user actuated member for moving the snap-acting blade towards the bi-metal blade, wherein the switch assembly provides an electrical path between the heating element and an electrical power supply cord without an additional separate user actuated power switch along the path.

2. An electric toaster as in claim 1 wherein the thermostat further comprises an ambient compensating bi-metal blade for applying a counterforce to the bi-metal electrical contact blade.

3. An electric toaster as in claim 1 wherein the thermostat further comprises a heat generating device thermally coupled to the bi-metal electrical contact blade.

4. An electric toaster as in claim 1 wherein the switch assembly further comprises an adjustment screw for adjustably locating the snap-acting blade on the thermostat.

5. An electric toaster as in claim 1 wherein the user actuated member comprises a rocker switch with a first arm for directly contacting and moving the snap-acting blade in a first direction.

6. An electric toaster as in claim 5 wherein the rocker switch has a second arm for directly contacting and moving the snap-acting blade in an opposite second direction.

7. In an electrical heating appliance having a heating element and an electrical power supply cord having a plug for connection to an electrical outlet for supplying electricity to the heating element, wherein the improvement comprises:

a combined user actuated power ON and thermostat switch assembly connecting the electrical power supply cord to the heating element, wherein the switch assembly comprises a user actuated member and a thermostat, the thermostat comprising a bi-metal electrical contact blade and a snap-acting electrical contact blade, wherein the user actuated member and the bi-metal electrical contact blade are adapted to move the snap-acting blade, and wherein the switch assembly provides an electrical path between the heating element and the power supply cord.

8. An appliance as in claim 7 wherein the thermostat further comprises an ambient compensating bi-metal blade for applying a counterforce to the bi-metal electrical contact blade.

9. An appliance as in claim 7 wherein the thermostat further comprises a heat generating device thermally coupled to the bi-metal electrical contact blade.

10. An appliance as in claim 7 wherein the switch assembly further comprises an adjustment screw for adjustably locating the snap-acting blade on the thermostat.

11. An appliance as in claim 7 wherein the user actuated member comprises a rocker switch with a first arm for directly contacting and moving the snap-acting blade in a first direction.

12. An appliance as in claim 11 wherein the rocker switch has a second arm for directly contacting and moving the snap-acting blade in an opposite second direction.

13. A method of controlling heating in an electrical heating appliance comprising steps of:

providing the appliance with a thermostat having a snap-acting electrical contact blade and a bi-metal electrical contact blade;

actuating a user actuated member to push against the snap-acting blade and thereby snap move the snap-acting blade from a first position into contact with the bi-metal blade at a second position, wherein an electrical path is provided through the thermostat to a heating element of the appliance; and the bi-metal blade moving with a temperature increase in the appliance to move the snap-acting blade to snap move away from the bi-metal blade back towards the first position, wherein the thermostat and user actuated member function as a power ON switch for the appliance.

* * * * *